United States Patent [19]
Fleury et al.

[11] Patent Number: 5,290,631
[45] Date of Patent: Mar. 1, 1994

[54] HYDROSOLUBLE/HYDRODISPERSIBLE POLYESTERS AND SIZING OF TEXTILE THREADS THEREWITH

[75] Inventors: Etienne Fleury, Lyons; Yvette Girardeau, Fontaines-Sur-Saone, both of France

[73] Assignee: Rhone-Poulenc Chimie, Courbevoie, France

[21] Appl. No.: 968,306

[22] Filed: Oct. 29, 1992

[30] Foreign Application Priority Data

Oct. 29, 1991 [FR] France ................. 91 13595

[51] Int. Cl.$^5$ ............................................. D02G 3/00
[52] U.S. Cl. ................................. 428/364; 528/272; 528/274; 528/279; 528/283; 528/285; 528/295; 528/300; 528/301; 528/302; 528/308; 528/308.6; 524/174; 524/177; 524/601; 524/603; 524/604; 524/605; 524/608; 524/609; 524/700; 524/783; 428/480
[58] Field of Search ............ 528/272, 274, 279, 283, 528/285, 295, 300, 301, 302, 308, 308.6; 524/174, 177, 601, 603, 604, 605, 608, 609, 700, 783; 428/480, 364

[56] References Cited

U.S. PATENT DOCUMENTS

| | | | |
|---|---|---|---|
| 3,725,351 | 4/1973 | Harrison et al. | 528/272 |
| 4,377,682 | 3/1983 | Ohguchi et al. | 528/301 |
| 4,483,976 | 11/1984 | Yamamoto et al. | 528/295 |

FOREIGN PATENT DOCUMENTS

| | | |
|---|---|---|
| 0029620A1 | 6/1981 | European Pat. Off. . |
| 0260203A1 | 3/1988 | European Pat. Off. . |
| 0275802A3 | 7/1988 | European Pat. Off. . |
| 0378954A3 | 7/1990 | European Pat. Off. . |
| 2608506 | 6/1988 | France . |

OTHER PUBLICATIONS

Patent Abstracts of Japan, vol. 10, No. 219 (C-363), Jul. 13, 1986; & JP-A-61057618 (Teijin Ltd.) Dec. 26, 1973.
Database WPI Derwent Publications Ltd., London, GB; accession No. 7439064v, week 7421; & JP-A-48103883 (Toyobo Co. Ltd.) Dec. 26, 1973.

*Primary Examiner*—John Kight, III
*Assistant Examiner*—Sam A. Acquah
*Attorney, Agent, or Firm*—Burns, Doane, Swecker & Mathis

[57] ABSTRACT

Hydrosoluble/hydrodispersible polyester copolycondensates, well suited for the sizing of textile threads, comprise terephthalate, isophthalate, sulfoaryl dicarboxylate, ethylene glycol and polyoxyethylene glycol recurring structural units, have a glass transition temperature ranging from 15° to 40° C. at 85% relative humidity and the turbidity of aqueous formulations thereof are storage-stable over time; such polyester copolycondensates are conveniently prepared by (i) transesterifying admixture of dimethyl terephthalate, dimethyl sulfoaryl dicarboxylate and ethylene glycol, (ii) introducing isophthalic acid and an additional amount of ethylene glycol into the medium of transesterification and therein directly esterifying same, and (iii) polycondensing the resulting product of transesterification/direct esterification.

24 Claims, No Drawings

HYDROSOLUBLE/HYDRODISPERSIBLE POLYESTERS AND SIZING OF TEXTILE THREADS THEREWITH

BACKGROUND OF THE INVENTION

1. Field of the Invention

The present invention relates to the preparation of hydrosoluble and/or hydrodispersible polyesters and to the use of such polyesters for the sizing of textile threads, notably polyester threads.

By the term "threads" are intended both assemblies of long unitary filaments or yarns formed from discontinuous fibers.

2. Description of the Prior Art

Copolyesters which are soluble or dispersible in water, simultaneously comprising terephthalic, isophthalic, sodium-5-oxysulfonyl isophthalic, ethylene glycol and polyethylene glycol recurring structural units are described in FR-A-1,602,002. These are prepared via the copolycondensation of dimethyl terephthalate, dimethyl isophthalate, sodium-5-oxysulfonyl isophthalic acid and a mixture of ethylene glycol and polyethylene glycols, in which the polyethylene glycols constitute at least 20% of the mixture. Such copolyesters are used as temporary finishes in the textile industry. The process for the preparation thereof entails the use of relatively expensive diols, such as diethylene glycol.

In JP-A-88/256,619 it is indicated that the aforesaid process does not readily provide an adequate degree of polycondensation. To obviate this disadvantage, JP-A-88/256,619 describes first conducting a direct esterification stage between the terephthalic acid, the isophthalic acid and the ethylene glycol, followed by a transesterification reaction between the dimethyl sodium-5-oxysulfonyl isophthalate and an additional amount of ethylene glycol, and thence a final polycondensation. This process makes it possible to provide a minimum proportion, below 2%, of diethylene glycol units.

SUMMARY OF THE INVENTION

Accordingly, a major object of the present invention is the provision of novel hydrosoluble and/or hydrodispersible copolyesters comprising, in addition to ethylene glycol —OCH$_2$—CH$_2$—O— recurring structural units, various polyoxyethylene glycol recurring structural units —O$(CH_2$—CH$_2$—O$)_n$, in which n is a number ranging from 2 to 4.

Another object of the present invention is the provision of copolyesters having a lower glass transition temperature than those prepared by the process of JP-A-88/256,619 and which can be adjusted depending upon the intended applications thereof.

Briefly, the present invention features the preparation of hydrosoluble and/or hydrodispersible copolyesters comprising terephthalate, isophthalate, sulfoaryl dicarboxylate, ethylene glycol and polyoxyethylene glycol recurring structural units, which comprises:

(a) a transesterification reaction (interchange) between, on the one hand, the dimethyl terephthalate and a dimethyl sulfoaryl dicarboxylate and, on the other, the ethylene glycol;

(b) a direct esterification reaction between the isophthalic acid and an additional amount of ethylene glycol; and (c) a polycondensation reaction.

DETAILED DESCRIPTION OF THE PREFERRED EMBODIMENTS OF THE INVENTION

More particularly according to the present invention, hydrosoluble and/or hydrodispersible copolyesters comprising terephthalate, isophthalate, sulfoaryl dicarboxylate, ethylene glycol and polyoxyethylene glycol recurring structural units are prepared by, successively:

(a) conducting a transesterification reaction (interchange) between the dimethyl terephthalate and a dimethyl sulfoaryl dicarboxylate and the ethylene glycol, the ethylene glycol/diester molar ratio advantageously ranging from 1.8 to 3.5 and preferably from 2.0 to 3.0;

(b) directly esterifying the isophthalic acid with an additional amount of ethylene glycol, the ethylene glycol/isophthalic acid molar ratio advantageously ranging from 1.8 to 3.0 and preferably from 2.0 to 2.8; and (c) polycondensing the products of the aforesaid reactions.

The methyl sulfoaryl dicarboxylates employed in the process of the invention are compounds having at least one sulfonic acid group, typically in the form of alkali metal sulfonate and two carboxylic acid functions bonded to one or more aromatic cyclic ring members. Particularly exemplary such compounds have the formula (I):

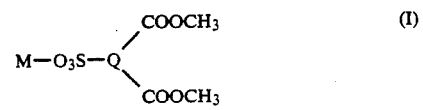

in which M is a hydrogen atom or, preferably, a sodium, potassium or lithium atom, and Q is a phenyl radical or a combination of a plurality of ortho-condensed or peri-condensed phenyl radicals, or a plurality of phenyl radicals bonded to one another by inert bridges such as a single valence bond, an alkylene radical, an ether group, ketone group or sulfone group, etc.

Specific examples of such compounds of formula (I) include the following dimethyl esters of dicarboxylic acids, whose sulfone function is free or salified by a sodium, potassium or lithium atom, i.e., sulfoterephthalic acids, sulfoisophthalic acids, sulfoorthophthalic acids, 4-sulfonaphthalene-2,7-dicarboxylic acid, 4,4,'-sulfo-bis(hydroxy-carbonyl)-diphenyl sulfones, sulfodiphenyl dicarboxylic acids, 4,4,'-sulfo-bis(hydroxycarbonyl)-diphenyl methanes and 5-sulfophenoxy-isophthalic acids.

Particularly preferred compounds of formula (I) according to the invention include dimethyl sodium-5-oxysulfonyl isophthalate.

The interexchange reaction is carried out at a temperature adapted to eliminate from the reaction medium the methanol formed in the reaction. Such elimination of the formed methanol is normally effected by distillation.

The interexchange reaction is preferably carried out at a temperature equal to or higher than 130° C. and which more preferably ranges from 140° to 250° C.

Typically, the reaction is carried out under atmospheric pressure, but it can also be conducted under a lower pressure.

This reaction is preferably carried out in the presence of a transesterification catalyst. The transesterification catalysts are generally metal derivatives.

The most advantageous such catalysts are metal carboxylates, such as manganese acetate, zinc acetate, cobalt acetate or calcium acetate; organic titanates such as butyl titanate or 2,2',2"-nitrolotriethyl (or titanium amino triethanolate) and mineral titanates such as calcium titanate. Among such catalysts, preferred are the organic titanates, particularly those indicated above.

The amount of catalyst is advantageously at least 0.005% by weight/total weight of the reagents and preferably ranges from 0.01% to 2% by weight/weight.

The interexchange reaction is generally continued up to the distillation of virtually all of the methanol formed, i.e., at least 90% of the methanol formed. Preferably, at least a portion of the ethylene glycol excess introduced at the beginning of the reaction, based on the stoichiometric amount, is also distilled after methanol elimination.

The esterification stage is then conducted by adding isophthalic acid and ethylene glycol to the reaction medium. The temperature at which this addition is carried out corresponds to the temperature at the end of the interexchange stage. The temperature of the direct esterification reaction advantageously ranges from 210° to 280° C. and preferably from 220° to 260° C.

The direct esterification reaction is usually carried out in the presence of a catalyst. The direct esterification catalyst can be constituted by the catalyst indicated above for the interexchange reaction. Preferably, the same catalyst is used for the interexchange and direct esterification reactions. In this event, the catalyst can be introduced, in toto, during the interexchange stage, or can be introduced on a number of different occasions.

The amount of direct esterification catalyst generally constitutes at least 0.005% by weight, based on the weight of the isophthalic acid and the ethylene glycol used in said direct esterification reaction. Preferably, such amount of direct esterification catalyst will range from 0.01% to 2% by weight/weight.

During the direct esterification stage, elimination takes place by distillation of the water formed in the reaction and the excess of ethylene glycol. When the direct esterification stage is completed, i.e., when the water and the excess of ethylene glycol have been eliminated from the reaction mixture, the polycondensation reaction is carried out.

The polycondensation reaction is typically catalyzed. Antimony trioxide and germanium dioxide are representative polycondensation catalysts. The catalyst can be introduced into the reaction medium at the end of the direct esterification reaction, or beforehand. The polycondensation reaction is generally carried out, at a temperature of from 230° to 280° C. and preferably from 240° to 260° C. It is preferably carried out under a pressure below atmospheric pressure.

Preferably, the pressure in the reactor is progressively decreased from the initial pressure to a pressure which can, e.g., extend to 10 Pa. This pressure reduction can be effected over a few minutes to a few hours, but most typically is conducted within 30 minutes to 2 hours.

The process of the invention permits preparation of hydrosoluble and/or hydrodispersible copolyesters having a structure and properties making them particularly suitable for the sizing of textile threads. The weight average molecular weight of such copolyesters generally ranges from 40,000 to 60,000 but, if appropriate, can be extended beyond these values. These weight average molecular weights are measured by gel chromatography in a solvent vector (at 60° C.) such as dimethyl acetamide or N-methyl pyrrolidone containing $5 \times 10^{-3}$N of LiBr. These results are expressed in polystyrene equivalents.

Such polyesters thus essentially comprise backbone chains of terephthalate, sodium-5-oxysulfonyl isophthalate, isophthalate, ethylene glycol and polyoxyethylene glycol recurring structural units.

In the backbone skeleton of the hydrosoluble and/or hydrodispersible copolyesters of the present invention, the different structural units are represented as follows:
terephthalate unit = terephthalic acid residue:

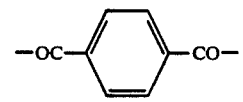

isophthalate unit = isophthalic acid residue:

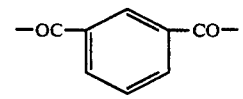

sulfoaryl dicarboxylate unit = sulfoaryl dicarboxylic acid residue:

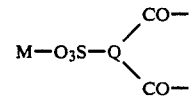

The polyoxyethylene glycol units are recurring ethylene radicals separated by oxygen atoms and are typically the following radicals:
—O—CH$_2$CH$_2$—O—CH$_2$—CH$_2$—O—, typically designated diethylene glycol (or 1,4,7-trioxaheptamethylene),
—O—CH$_2$—CH$_2$—O—CH$_2$—CH$_2$—O—CH$_2$—CH$_2$—O—, typically designated triethylene glycol (or 1,4,7,10-tetraoxadecamethylene),
—O—CH$_2$—CH$_2$—O—CH$_2$—CH$_2$—O—CH$_2$—CH$_2$—O—CH$_2$—CH$_2$—O—, typically designated tetraethylene glycol (or 1,4,7,10,13-pentaoxatridecamethylene).

In the formula of the copolyesters according to the invention, the molar percentage of each of the ethylene glycol and polyoxyethylene glycol structural units based on the total number of said structural units is generally within the following ranges:
Ethylene glycol (EG) units: 35% to 60%
Diethylene glycol (DEG) units: 20% to 50%
Triethylene glycol (TEG) units: 5% to 25%
Tetraethylene glycol (QEG) units: 0% to 5%.

The structural units from each of the diacids according to this invention are distributed in the following manner as a molar percentage based on all of the structural units provided by the diacids:
Terephthalate (TER) unit: 10% to 75%.
Isophthlate (ISO) unit: 15% to 70%

Sulfoaryl dicarboxylate unit and more particularly sodium-5-oxysulfonyl isophthalate (NaS-ISO) unit: 8% to 20%.

According to the invention, hydrosoluble and/or hydrodispersible copolyesters are prepared having a glass transition temperature at 85% relative humidity equal to or higher than 15° C. and equal to or below 40° C.

Therefore, the copolyesters are particularly suited for the sizing of textile threads, because they provide the best possible compromise between two primary defects, which are blocking during the reuniting of primary beams or unwinding from the beam bobbin on the loom and the soiling of the looms by dusting (phenomenon representative of abrasion).

The hydrosoluble and/or hydrodispersible copolyesters prepared according to the invention also have, in an, e.g., 10% to 25% aqueous solution, a good stability over time. These aqueous copolyester solutions exhibit a low turbidity value, which does not or only very slightly evolves over time and, consequently, there is no settling of the solutions after being stored for a few days or weeks.

The present invention also features a process for the sizing of a plurality of textile threads by applying thereto the hydrosoluble and/or hydrodispersible copolyesters of the present invention in an aqueous medium. The principle of this procedure is the immersion of the threads in an aqueous bath containing the copolyester at the desired concentration and temperature, followed by the draining of said threads by passing same between rollers and, finally, the drying of the sized threads in drying chambers, the tow then being ready for weaving.

Among the conventional methods for sizing a filament yarn, representative are, e.g., the European system, the classic or English system, and the single end sizing or Japanese system.

The copolyesters according to the invention are particularly useful for the finishing of synthetic ethylene glycol polyterephthalate filament yarns or threads, which are among the textile threads or yarns which are the most difficult to size, but are also useful for ethylene glycol polyterephthalate spun yarns or fibers optionally mixed with natural fibers, for natural fibers such as, e.g., cotton, for glass fibers or for other fibers such as synthetic threads, e.g., acrylics, polyimides, polyvinyl chloride fibers, polyethylene, polypropylene or artificial threads such as acetates, triacetates and viscose.

Moreover, any random thread type can be sized with the subject copolyesters, no matter whether it is textured or not, twisted or not and using any random sizing technique, namely, the European, English or Japanese system.

A very important advantage of these materials is that they resist the output constraints of new looms. They permit sizing and weaving to be carried out at high speed, while they can also be easily eliminated with water.

In order to further illustrate the present invention and the advantages thereof, the following specific examples are given, it being understood that same are intended only as illustrative and in nowise limitative.

EXAMPLE 1

Into a 7.5 liter stainless steel reactor, equipped with an anchor agitator, a double envelope for the circulation of a heat transfer liquid and an electrovalve-regulated distillation, column, the following reagents were introduced cold:

(i) 2,262 g (11.648 mole) of dimethyl terephthalate (DMT), (ii) 577 g (1.947 mole) of dimethyl sodium-5-oxysulfonyl isophthalate (SIPD), (iii) 2,453 g (39.56 mole) of ethylene glycol (EG), (iv) 0.91 g of titanium aminotriethanolate as the interexchange catalyst, (v) 0.237 g of antimony trioxide as the polycondensation catalyst.

Diol/diester molar ratio $MR_1 = 2.91$.

Stirring or agitation was commenced and then the reactor contents were rapidly heated to 182° C., at which point the methanol began to distill. The reaction mixture temperature was then increased to from 220° to 230° C. over approximately 120 minutes in order to distill all of the methanol and a portion of the excess ethylene glycol. When the reaction mass was at 230° C., over a 1 hour period was introduced the following isophthalic acid/ethylene glycol suspension:

495 g (2.98 mole) of isophthalic acid (AI), 472 g (7.615 mole) of ethylene glycol (EG).

Diol/diacid molar ratio $MR_2 = 2.555$.

During the introduction, the temperature did not drop below 227° C. and did not exceed 233° C. After introducing the above suspension, the reaction mass was heated to 230° to 250° C. over 1 hour, during which time period a water/ethylene glycol mixture was distilled.

At 250° C., the reaction mass was transferred into an autoclave preheated to 250° C. The pressure was then reduced from 100 KPa (atmospheric pressure) to 130 Pa over 50 minutes and polycondensation was continued for approximately 45 minutes. The polymer was then poured and cooled.

The following analyses were then performed:

(1) Evaluation of the weight average molecular weight by gel chromatography (GC) in N-methyl pyrrolidone at 60° C. The values are reported in polystyrene equivalents.

(2) Estimation of the content of ethylene glycol and polyoxyethylene glycol structural units by prior methanolysis of the polymer and dosing by vapor phase chromatography (VPC). The results are reported for each unit as a molar percentage based on the sum of said units.

(3) Determination of the glass transition temperatures (Tg °C.) following the conditioning of the polymers in film form at 85% relative humidity for 8 days.

(4) Measurement of the turbidity immediately following solubilization and after 10 days storage. The measurement was carried out, with 25% polymer solutions in demineralized water, on a Hach turbidimeter, the results being reported in normal turbidity units (NTU) and the apparatus was previously calibrated with a formazine solution.

The properties of the copolyester (A) obtained are reported in Table 1.

EXAMPLE 2

The procedure of Example 1 was repeated, but modifying the molar ratios. The following amounts of the reagents were introduced:

| | | |
|---|---|---|
| DMT | 2,262 g (11.648 mole) | |
| SIPD | 577 g (1.947 mole) | $MR_1 = 2.1$ |
| EG | 1,770 g (28.549 mole) | |
| AI | 495 g (2.98 mole) | |
| | | $MR_2 = 2.555$ |
| EG | 472 g (7.615 mole) | |
| Catalysts | 0.91 g of titanium aminotriethanolate and 0.237 g of antimony trioxide. | |

The properties of the thus obtained copolyester $A_1$ are reported in the following Table 1.

EXAMPLE 3

The procedure of Example 1 was repeated, but in which the molar ratios were modified. The following amounts of the reagents were introduced:

| | | |
|---|---|---|
| DMT | 2,262 g (11.648 mole) | |
| SIPD | 577 g (1.947 mole) | $MR_1 = 2.1$ |
| EG | 1,770 g (28.549 mole) | |
| AI | 495 g (2.98 mole) | |
| | | $MR_2 = 2.3$ |
| EG | 425 g (6.854 mole) | |
| Catalysts: | 0.91 g of titanium aminotriethanolate and 0.237 g of antimony trioxide. | |

The properties of the thus obtained copolyester $A_2$ are reported in the following Table 1.

EXAMPLE 4

The procedure of Example 1 was repeated, but modifying the molar ratios. The following amounts of the reagents were introduced:

| | | |
|---|---|---|
| DMT | 2,262 g (11.648 mole) | |
| SIPD | 577 g (1.947 mole) | $MR_1 = 2.1$ |
| EG | 1,770 g (28.549 mole) | |
| AI | 495 g (2.98 mole) | |
| | | $MR_2 = 2$ |
| EG | 369 g (5.96 mole) | |
| Catalysts: | 0.91 g of titanium aminotriethanolate and 0.23% of antimony trioxide. | |

The properties of the thus obtained copolyester $A_3$ are reported in Table 1.

EXAMPLE 5

The procedure of Example 1 was repeated, but modifying the molar ratios. The following amounts of reagents were introduced:

| | | |
|---|---|---|
| DMT | 2,262 g (11.648 mole) | |
| SIPD | 577 g (1.947 mole) | $MR_1 = 2.91$ |
| EG | 2,453 g (39.56 mole) | |
| AI | 499 g (2.98 mole) | |
| | | $MR_2 = 2$ |
| EG | 369 g (5.96 mole) | |
| Catalysts: | 0.91 g of titanium aminotriethanolate and 0.237 g of antimony trioxide. | |

The properties of the thus obtained copolyester $A_4$ are reported in Table 1.

EXAMPLE 6

In order to compare the above copolyesters prepared according to the invention with copolyesters having different structures, copolyesters B and $B_1$ were prepared in accordance with the following operating procedure.

Into the same steel reactor as indicated in Example 1 were introduced cold the following reagents:
DMT: 2,006 g (10.329 mole)
DMI*: 512 g (2.64 mole)
SIPD: 512 g (1.727 mole)
EG: 518 g (8.37 mole)
DEG**: 2,071 g (19.54 mole) $MR_3 = EG/DEG = 30/70$

*DMI = dimethyl isophthalate
**DEG = diethylene glycol.
Catalysts: 0.83 g of titanium aminotriethanolate, 0.215 g of antimony trioxide and 2.25 g of sodium acetate.

The properties of copolyester B are reported in Table 2.

Stirring was initiated and then the reactor contents were rapidly heated to 182° C., at which temperature the methanol began to distill. The reaction mixture temperature was then increased from 182° to 250° C. for approximately 2 hours, 40 minutes, in order to distill all of the methanol. At 250° C., the reaction mass was transferred into an autoclave preheated to 250° C. The pressure was then reduced from 100 KPa to 130 Pa over 50 minutes and polycondensation was continued for 60 minutes.

EXAMPLE 7

The procedure of Example 6 was repeated, but modifying the respective ethylene glycol (EG) and diethylene glycol (DEG) amounts, as follows:
DMT: 2,006 g (10.329 mole)

DMI: 512 g (2.641 mole)
SIPD: 512 g (1.727 mole)
EG: 865 g (13.96 mole)
DEG: 1,480 g (13.96 mole) MR$_3$=EG/DEG=50/50
Catalysts: 0.83 g of titanium aminotriethanolate, 0.215 g of antimony trioxide and 2.25 g of sodium acetate.
The properties of copolyester B$_1$ are reported in Table 2.

TABLE 1

| Copolyesters | Diols introduced (molar %/ε diols) | | | | Molecular weight | | Tg °C. | Turbidity (NTU) | |
|---|---|---|---|---|---|---|---|---|---|
| | EG | DEG | TEG | QEG | Mw* | Mn** | (85% RH) | 0 d | 10 d |
| A | 41 | 39 | 17.5 | 2.5 | 45,700 | 21,900 | 15 | 49 | 49 |
| A$_1$ | 48.5 | 32.7 | 17.1 | 1.6 | 50,210 | 23,600 | 25 | 49 | 49 |
| A$_2$ | 56 | 33.1 | 7.5 | <0.5 | 41,970 | 18,520 | 38 | 48 | 50 |
| A$_3$ | 51 | 35.7 | 10.9 | 2.4 | 46,780 | 21,000 | 29 | 53 | 54 |
| A$_4$ | 47.2 | 36.4 | 14.1 | 2.3 | 48,640 | 21,420 | 23 | 49 | 49 |

*Mw = weight average molecular weight
**Mn = number average molecular weight

TABLE 2

| Copolyesters | Diols introduced (molar %/ε diols) | | | | Molecular weight | | Tg °C. | Turbidity (NTU) | |
|---|---|---|---|---|---|---|---|---|---|
| | EG | DEG | TEG | QEG | Mw | Mn | (85% RH) | 0 d | 10 d |
| B | 21 | 78.25 | 0 | 0.75 | 43,000 | 20,770 | 13 | 58 | 119 |
| B$_1$ | 35.9 | 60.15 | 2.8 | 1.05 | 48,000 | 23,000 | 21 | 59 | 75 |

It will be appreciated that with the aqueous solutions of copolyesters A to A$_4$ obtained according to the invention, a turbidity stability existed upon storage, whereas the copolyesters prepared according to the prior art were subject to a rapid evolution of said turbidity. After storage for one month, the solutions of copolyesters A to A$_4$ remained homogeneous, whereas the solutions of copolyesters B and B$_1$ had settled and were not suitable for the sizing of textile fibers.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A hydrosoluble/hydrodispersible polyester copolycondensate comprising terephthalate, isophthalate, sulfoaryl dicarboxylate, ethylene glycol and polyoxyethylene glycol recurring structural units, having a glass transition temperature ranging from 15° to 40° C. at 85% relative humidity, and the turbidity of an aqueous formulation thereof being storage-stable over time.

2. The hydrosoluble/hydrodispersible polyester copolycondensate as defined by claim 1, having a weight average molecular weight ranging from 40,000 to 60,000.

3. The hydrosoluble/hydrodispersible polyester copolycondensate as defined by claim 1, the molar ratio of said ethylene glycol recurring structural units ranging from 35% to 60%, based on the total amount of said ethylene/polyoxyethylene glycol recurring structural units.

4. The hydrosoluble/hydrodispersible polyester copolycondensate as defined by claim 3, comprising diethylene glycol recurring structural units in a molar ratio ranging from 20% to 50%, based on the total amount of said ethylene/polyoxyethylene glycol recurring structural units.

5. The hydrosoluble/hydrodispersible polyester copolycondensate as defined by claim 4, comprising triethylene glycol recurring structural units in a molar ratio ranging from 5% to 25%, based on the total amount of said ethylene/polyoxyethylene glycol recurring structural units.

6. The hydrosoluble/hydrodispersible polyester copolycondensate as defined by claim 5, comprising tetraethylene glycol recurring structural units in a molar ratio of up to 5%, based on the total amount of said ethylene/polyoxyethylene glycol recurring structural units.

7. The hydrosoluble/hydrodispersible polyester copolycondensate as defined by claim 3, the molar ratio of said terephthalate recurring structural units ranging from 10% to 75%, based on the total amount of said terephthalate/isophthalate/dicarboxylate recurring structural units.

8. The hydrosoluble/hydrodispersible polyester copolycondensate as defined by claim 7, the molar ratio of said isophthalate recurring structural units ranging from 15% to 70%, based on the total amount of said terephthalate/isophthalate/dicarboxylate recurring structural units.

9. The hydrosoluble/hydrodispersible polyester copolycondensate as defined by claim 8, the molar ratio of said sulfoaryl dicarboxylate recurring structural units ranging from 8% to 20%, based on the total amount of said terephthalate/isophthalate/dicarboxylate recurring structural units.

10. The hydrosoluble/hydrodispersible polyester copolycondensate as defined by claim 1, said sulfoaryl dicarboxylate recurring structural units having the formula:

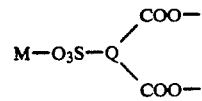

in which M is a hydrogen, sodium, potassium or lithium atom, and Q is a phenyl radical or a combination of a plurality of ortho- or peri-condensed phenyl radicals, or a plurality of phenyl radicals bonded together via inert bridging groups.

11. The hydrosoluble/hydrodispersible polyester copolycondensate as defined by claim 10, said sulfoaryl dicarboxylate recurring structural units comprising sodium 5-oxysulfonyl isophthalate recurring structural units.

12. A process for the preparation of the hydrosoluble/hydrodispersible polyester copolycondensate as defined by claim 1, comprising (i) transesterifying admixture of dimethyl terephthalate, dimethyl sulfoaryl dicarboxylate and ethylene glycol, (ii) introducing isophthalic acid and an additional amount of ethylene glycol into the medium of transesterification and therein directly esterifying same, and (iii) polycondensing the resulting product of such transesterification/direct esterification.

13. The process as defined by claim 12, wherein said transesterification admixture (i) the molar ratio ethylene glycol/diester range from 1.8 to 3.5.

14. The process as defined by claim 13, said molar ratio ranging from 2.0 to 3.0.

15. The process as defined by claim 13, wherein said medium of direct esterification (ii) the molar ratio ethylene glycol/isophthalic acid ranges from 1.8 to 3.0.

16. The process as defined by claim 15, said molar ratio ranging from 2.0 to 2.8.

17. The process as defined by claim 12, wherein the temperature of transesterification is at least 130° C.

18. The process as defined by claim 12, said transesterification (i) being carried out in the presence of a catalytically effective amount of a metal carboxylate or an organic or inorganic titanate transesterification catalyst.

19. The process as defined by claim 12, said direct esterification (ii) being carried out in the presence of a catalytically effective amount of a metal carboxylate or an organic or inorganic titanate direct esterification catalyst.

20. The process as defined by claim 12, said polycondensation (iii) being carried out in the presence of a catalytically effective amount of antimony trioxide or germanium dioxide.

21. A textile thread sized with an effective sizing amount of the hydrosoluble/hydrodispersible polyester copolycondensate as defined by claim 1.

22. An aqueous solution of a hydrosoluble polyester copolycondensate as defined by claim 1.

23. An aqueous dispersion of a hydrodispersible polyester copolycondensate as defined by claim 1.

24. A hydrosoluble/hydrodispersible polyester copolycondensate comprising terephthalate, isophthalate, sulfoaryl dicarboxylate, ethylene glycol and polyoxyethylene glycol recurring structural units, having a glass transition temperature ranging from 15° to 40° C. at 85% relative humidity, and the turbidity of an aqueous formulation thereof being storage-stable over time, said copolycondensate being formed by a process comprising (i) transesterifying an admixture of dimethyl terephthalate, dimethyl sulfoaryl dicarboxylate and ethylene glycol, (ii) introducing isophthalic acid and an additional amount of ethylene glycol into the medium of transesterification and therein directly esterifying same, and (iii) polycondensing the resulting product of such transesterification/direct esterification.

* * * * *